(12) United States Patent
Frost et al.

(10) Patent No.: US 6,656,516 B1
(45) Date of Patent: Dec. 2, 2003

(54) LOW-BROWNING BREADCRUMB PRODUCTS

(75) Inventors: Matthew J. Frost, Norwich (GB); Simon J. Goddard, Cambs (GB); Julie Ann Howard, Haverhill (GB); Jane L. Atkinson, Bristol (GB); Adrian Robert Dobson, Rotherham (GB)

(73) Assignee: Kerry Ingredients (UK) Limited, Bristol (GB)

( * ) Notice: Subject to any disclaimer, the term of this patent is extended or adjusted under 35 U.S.C. 154(b) by 0 days.

(21) Appl. No.: 09/601,187

(22) PCT Filed: Jan. 26, 1999

(86) PCT No.: PCT/GB99/00095

§ 371 (c)(1),
(2), (4) Date: Nov. 1, 2000

(87) PCT Pub. No.: WO99/38391

PCT Pub. Date: Aug. 5, 1999

(30) Foreign Application Priority Data

| Jan. 30, 1998 | (GB) | ............................................. 9801890 |
| Nov. 26, 1998 | (GB) | ................................................ 98254 |

(51) Int. Cl.$^7$ ................................................ A21D 13/00
(52) U.S. Cl. .......................... 426/549; 426/96; 426/560
(58) Field of Search ........................... 426/549, 94, 96, 426/289, 560, 561, 62

(56) References Cited

U.S. PATENT DOCUMENTS

| 3,486,904 A | 12/1969 | Ziegler |
| 4,297,378 A | 10/1981 | Haasl et al. |
| 4,904,493 A | 2/1990 | Petrizzelli |

FOREIGN PATENT DOCUMENTS

| EP | A2480433 | 4/1992 |
| FR | A1-2588159 | 10/1987 |
| GB | A2099277 | 12/1992 |

Primary Examiner—Lien Tran
(74) Attorney, Agent, or Firm—Birch, Stewart, Kolasch & Birch, LLP

(57) ABSTRACT

Bread products derived from a dough having a continuous network of developable protein having levels of reducing sugar sufficiently low such that browning under frying conditions is substantially reduced.

6 Claims, No Drawings

LOW-BROWNING BREADCRUMB PRODUCTS

This application is the national phase under 35 U.S.C. §371 of PCT International Application No. PCT/GB99/00095 which has an International filing date of Jan. 26, 1999, which designated the United States of America.

The present invention relates to low-browning bread products (particularly breadcrumbs), to food products incorporating such products and to processes for preparing and using such products.

The fast food service sector revolves around the need to take foods straight from the freezer and place in deep fat fryers until they are cooked and visually appetizing. For both visual and flavouring purposes, fast foodstuffs are frequently coated in breadcrumbs. However, after frying (typically by exposing the breadcrumbs to a temperature of approaching one hundred and ninety degrees centigrade for between two and four minutes), the crumbs turn dark brown or black and their organoleptic properties are adversely affected.

One method of cooking coated foodstuffs within the food industry is to deep fry foodstuffs at relatively low temperatures (as low as 175° C.), for upwards of ten or fifteen minutes. However, because speed of service is of paramount importance in many circumstances, it would be advantageous to increase the temperature of deep frying and so reduce cooking time (so increasing the speed of service and obviating- the need to prepare large quantities of food in advance).

There is therefore a need for a bread product that can withstand cooking, in particular deep frying, at high temperatures and/or for long time periods, whilst remaining light enough so that the crumb colour can be seen through the natural darkening of the crumb itself.

Studies have shown that the browning of crumb both during production and during frying can be attributed to two separate but not concurrent reactions: (i) enzymic reactions, and (ii) the Maillard reaction.

Enzymic Reactions

The mechanism behind the browning of fruits and vegetables and the browning of breadcrumbs or other bread products during manufacture are identical. When fruit and plant tissue is bruised or cut it rapidly turns brown or black. This discolouration is due to an enzyme catalysed reaction. It is generally accepted that enzyme-induced browning in fruits and vegetables is actuated by means of an enzyme system variously known as catecholase, diphenol oxidase, phenolase, polyphenol oxidase or tyrosinase. The correct nomenclature is $O_2$: o-diphenol oxidoreductase (POR). It has been shown that foodstuffs containing wheat comprising a high level of POR visibly darken over time, in contrast to those foodstuffs in which POR is absent.

Maillard Reaction

Of greater significance however is the Maillard reaction. This form of non-enzymic reaction often occurs in stored or frozen foods and has been the subject of extensive research by many food scientists.

The term "Maillard reaction" is a term of the art which defines a complex series of chemical reactions between carbohydrates containing at least one carbonyl group and amino components derived from biological systems. In foods, the Maillard reaction results in both the production of flavours and browning.

Any form of foodstuff that contains soluble sugars that are also reducing sugars (such as glucose, maltose or dextrose) can undergo browning due to the Maillard reaction. The browning reaction observed during the frying of conventional breadcrumb is explained by the presence in flour of approximately 2.5% dextrose, maltose and saccharose. In a typical Maillard reaction scheme where glucose participates in the reaction as a reducing sugar, it is believed that amino groups on protein sources react with the glucose to form glycosylamine. Glycosylamine re-arranges to form what is known in the art as an Amadori and Heyns rearrangement product (for example, a hydroxymethylfurfural), which is responsible for the appearance of brown pigments. Dehydration or fission of the Amadori and Heyns rearrangement products can produce furan derivatives, reductones and other carbonyl compounds which also contribute to the brown pigmentation.

The rate of browning of a material and the final colour obtained, depends mainly on the operating conditions, namely the temperature and the duration of the heat treatment.

In order to avoid excessive browning of material during heat treatment, it is possible to control the temperature and duration of the reaction and stop it before the colour becomes too dark. However, when the main objective is to cook a coated foodstuff and/or heat it thoroughly, prematurely halting of the cooking process could lead to a loss in the development of flavour and at worst, lead to food poisoning.

Inhibition of the Maillard reaction per se is difficult to achieve. Either, (i) the pH of the food can be lowered which would reduce the amount of browning by slowing down the rate of reaction; (ii) the temperature of cooking can be lowered (although the reaction will still occur even in frozen foods but at a much reduced rate); or (iii) the optimum water content may be avoided (usually by raising the moisture level, but this would have adverse effects on the properties of a fried coating). While the inclusion of sulphur dioxide has been shown to reduce the browning of foods quite substantially (by interfering with the polymerisation reactions that result in hydroxymethylfurfural production), sulphur dioxide is toxic and unpleasant to taste and its use in the food industry is limited.

JP-A-57100177 suggests that a colour-inhibiting agent comprising at least one calcium salt, preferably calcium chloride, be added to the mixture of amino-acids and carbohydrates before the reaction. It is suggested that the mixture obtained is less susceptible to browning by the Maillard reaction during subsequent heat treatment.

CA-850600 relates to the addition of an organic compound which is capable of hydrolysis in contact with water, to the mixture of amino acids and carbohydrates.

U.S. Pat. No. 5,480,663 suggests the addition of 0.01 to 0.1 parts by weight of a compound which includes or is capable of developing a thiol group; however, the product obtained must be heated at 95–110° C. for between 1 and 5 hours.

Therefore there remains a need for processes for controlling the rate of browning of bread products (especially breadcrumbs) on frying, and in particular for low-browning bread products (such as breadcrumbs).

Thus, according to the present invention there is provided a bread product derived from a dough having a continuous network of developable protein, wherein the level of sugar (e.g. reducing sugar) in the product is sufficiently low such that browning under frying conditions is substantially reduced.

The bread products of the invention may therefore be described as "low-browning", which is a term of art used to describe products in which the development of a brown colour on frying is retarded or suppressed relative to traditional bread products.

In preferred embodiments, the bread products may be crumbs (e.g. breadcrumbs such as Japanese crumb, extruded crumb or coating crumb), croutons, pizza bases or toasted sandwiches. However, the invention finds general application in any dough-based bread product which is ultimately fried prior to consumption.

A continuous network of developable protein is necessary for processability and good crumb texture and is a feature of most traditional bread-making processes. It may be achieved by mixing the dough under wholly conventional conditions. The state is characterised by a viscoelastic, non-stringy, non-sticky workable dough mass which can be further processed by, for example, tinning and baking. Those skilled in the art will be able readily to determine appropriate conditions from the rheological properties of the dough.

The term "developable protein" is a term of art defining any protein which can contribute to the formation of a continuous network during dough mixing and working thereby promoting the formation of a viscoelastic matrix within the dough. Preferably, the developable protein is gluten (where it may be present in the dough at a concentration of between 9 and 18% by weight). Lower concentrations may be used, but in such cases dough rheology and crumb texture are adversely affected and the processability of the dough is impaired. However, high concentrations may lead to undesirable rheological, organoleptic and browning properties (for example, gluten concentrations above 18% may in some circumstances lead to excessive browning).

The sugar in the product must be sufficiently low so that browning under frying conditions is substantially reduced. It will be appreciated that certain sugars (for example reducing sugars, e.g. any or all of glucose, maltose, dextrins and starch-derived reducing sugars) are key participants in the non-enzymic browning process (the Maillard reaction), and it is therefore the concentration of these sugars which is critical to the invention.

The level of reducing sugars in the dough is preferably sufficiently low such that heat-induced non-enzymatic browning reactions (e.g. the Maillard reaction and/or caramelization) are substantially reduced.

Thus, in another aspect, the invention relates to a bread product which exhibits reduced browning under frying conditions, the product being derived from a dough which is substantially free of reducing sugars.

References herein to substantially reduced browning under frying conditions means that a golden brown (but not dark brown or black) colour is developed when baked bread products of the invention are deep fried at 190° C. for two minutes. Some products may develop and retain a desirable golden brown colour even when deep fried at 190° C. for four minutes.

The dough may consist of a mixture of starch and developable protein. In such embodiments, the dough is comprised entirely of starch and developable protein (and may for example have been mixed from independently purified preparations of starch and protein). Such dough systems are therefore based on "synthetic flours" where many of the components usually present in flours (such as endogenous enzymes, sugars and sugar precursors) are absent.

However, it will be appreciated that hydration (usually with water) is required for dough development and other (minor) ingredients (such as yeast and improver) may also be present in the synthetic flour. Preferably, water is added at between 28–35% (for example 31–33%) to the dough.

Where improvers are used, the bread improver preferably comprises:
(a) a reducing agent (e.g. ascorbic acid); and/or
(b) a fat; and/or
(c) an emulsifier; and/or
(d) an anti-moulding agent; and/or
(e) yeast food; but is substantially free of:
(f) degradative enzymes which promote the generation of reducing sugars in the dough (e.g. amylase).

The term yeast food is a term of art used to define any of a wide range of substances used to promote yeast growth and/or activity (for example by serving as a carbon source for the yeast cells). A preferred example is dextrose.

In such embodiments, the improver may be added to a concentration of between 0.00 and 5.00% by weight to the dough.

Alternatively, the dough may be based on a modified flour. Such flours are pre-processed so as to deplete endogenous reducing sugars (e.g. by washing and/or enzymic digestion). They may also be treated to reduce or eliminate endogenous enzyme activity (e.g. amylase activity) which could generate reducing sugars in the dough.

In another embodiment, the dough is prepared from a flour derived from a botanic source (e.g. maize or rice) in which the concentration of reducing sugars (and optionally proteins which enter the Maillard reaction) is sufficiently low such that, when baked to produce a bread product, browning under frying conditions is substantially reduced. Such flours find particular application in circumstances where costs must be minimized, since flour preparations are in general less costly than isolated starch and/or developable protein preparations.

In particularly preferred embodiments, the dough is substantially free of enzyme activity which generates reducing sugars. For example, amylase is present in many flour fractions and is often added to conventional doughs as part of a bread improver composition. Amylase generates dextrins and glucose from starch which may promote browning by contributing to the Maillard reaction.

In preferred embodiments, the dough comprises:
(a) 50–60% starch; and/or
(b) 9–18% gluten; and/or
(c) 1–5% yeast; and/or
(d) 25–40% water; and optionally
(e) 0.0–0.5% improver and/or
(f) yeast food; and/or
(g) salt.

The flour may be present at 0–95% (e.g. 0–70%), the starch at 5–90% (e.g.30–70%), the gluten at 0–20% (e.g. 4–20%), the yeast at 1–10% (e.g. 1–5%), the water at 20–40% (e.g. 28–35%), the salt at 0–10% (e.g. 0–5%) and improver at 0–5% (e.g. 0–0.5%), the latter including yeast food at 0–5% and improver enzyme at 0–1%).

As used herein, the term improver is used to define any ingredient which is added to a dough recipe to enhance the performance of the dough. The term improver enzyme therefore defines any enzyme component of the improver, and includes glucose oxidases, lipases, amyloglucosidases, pentosanases, proteases, xylanases and hemicellulases.

In a further aspect, the invention contemplates a process for controlling the browning characteristics of a bread product (e.g. a breadcrumb), the process comprising the step of controlling the level of inclusion of reducing sugars in the bread product.

In these embodiments, the level of browning may be predetermined by adding back a defined amount of a standard flour (e.g. wheat flour) and/or fine fraction flour as a supplement to the low sugar flours (e.g. the synthetic or modified flours) described above.

As used herein, the term fine fraction flour refers to flours which have been classified to remove course grains to produce a flour with relatively low levels of natural sugars, proteins and enzymes. Such flours therefore have reduced pentosan and enzyme contents.

Thus, the invention finds application in circumstances where an increase in the rate and/or extent of browning is required, for example, in microwaveable food products.

In yet a further aspect, the invention provides a process for retarding the browning of a bread product on frying, the process comprising the step of eliminating or limiting the concentration of reducing sugars from the bread product prior to frying.

Thus, the processes of the invention may be used to produce bread products having predetermined browning characteristics.

The process of the invention preferably comprises the steps of providing a dough having a predetermined level of sugar which can participate in the Maillard reaction or in caramelization; and baking the dough.

In another aspect, the invention relates to a process for producing a bread product (e.g. a breadcrumb), the process comprising the steps of:

(a) mixing the dough of the invention, and (b) baking the mixed dough, and optionally (c) granulating the baked product.

The invention also contemplates a composite foodstuff incorporating the bread products of the invention, for example by conventional coating techniques.

Also contemplated is a coating ingredient system comprising the bread products of the invention. The system may for example comprise breadcrumbs, adhesion batter and seasonings.

In another aspect, the invention provides a dough for use in the production of the bread products of the invention, the dough: (a) comprising a continuous network of developable protein and having a level of reducing sugars sufficiently low such that, when baked to produce a bread product, browning under frying conditions is substantially reduced; or (b) being substantially free of reducing sugars.

In another aspect, the invention provides a bakery concentrate or bakery dry mix for use in the production of the dough of the invention, the concentrate or mix comprising developable protein and starch and either: (a) being substantially free of reducing sugars, or (b) having a level of reducing sugars sufficiently low such that, when mixed to form a dough and then baked to produce a bread product, browning under frying conditions is substantially reduced.

The invention will now be described with reference to the following example, which is merely exemplary and is not intended to limit the scope of the invention in any way. It will be appreciated that the invention may be modified without departing from the essential spirit and scope thereof.

EXAMPLE

Ingredients in doughs were mixed used a computing dough mixer with 500 g Z-blade Farinograph bowl at 30° C. Gluten, starch and salt were added at 14.27, 83.23 and 1% of dry ingredients respectively. Water was added to 31% of total dough weight. Block yeast was added with the water. The starch, gluten and salt were mixed for two minutes at 60 rpm; water and yeast were then added and mixed for two minutes at 20 rpm. Doughs were made to the Chorleywood process (40 kJ/kg work input at a rate of 20 Kj/kg per minute). After mixing, a 120 g portion of the dough was put through the Monomolder and placed in tins greased with sunflower oil. The doughs were then proved for 50 minutes at 40° C. (high relative humidity) and then baked for 20 minutes at 200° C. The baked loaf was then granulated and the crumb dried in a fluid bed drier at 110° C. for 8 minutes. The crumb could be fried for 4 minutes at 190° C. after which it exhibited a golden brown colour.

Control crumbs produced using standard baking doughs exhibited a dark brown burnt colour on frying under these conditions.

What is claimed is:

1. A breadcrumb product derived from a dough comprising 50–60% starch, 9–18% gluten which provides the dough with a continuous network of developable protein, 1–5% yeast, 28–35% water, and salt, wherein said breadcrumb product exhibits reduced browning under frying conditions.

2. The breadcrumb product of claim 1 wherein the dough further comprises up to 0.5% of a bread improver.

3. A breadcrumb product as defined in claim 1, further comprising one or more members selected from the group consisting of coloring agents, flavoring agents, texturizing additives, preservatives, vitamins, and food additives.

4. A coating ingredient system comprising the breadcrumb product of claim 1.

5. A composite foodstuff comprising the breadcrumb product of claim 1.

6. A breadcrumb product comprising:

(a) about 56% starch; and (b) 10% gluten; and (c) 3% yeast; and (d) 30% water.

* * * * *